Dec. 13, 1949 C. W. LANTER 2,491,321
ELECTRIC MOTOR STRUCTURE
Original Filed May 25, 1946 2 Sheets-Sheet 2
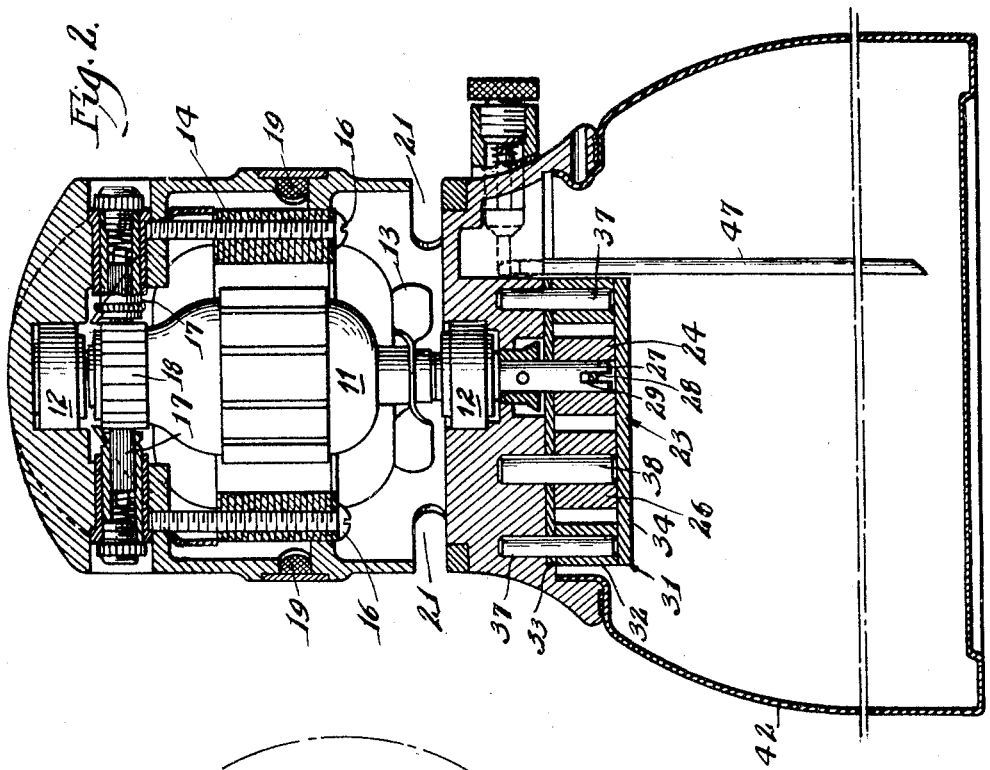
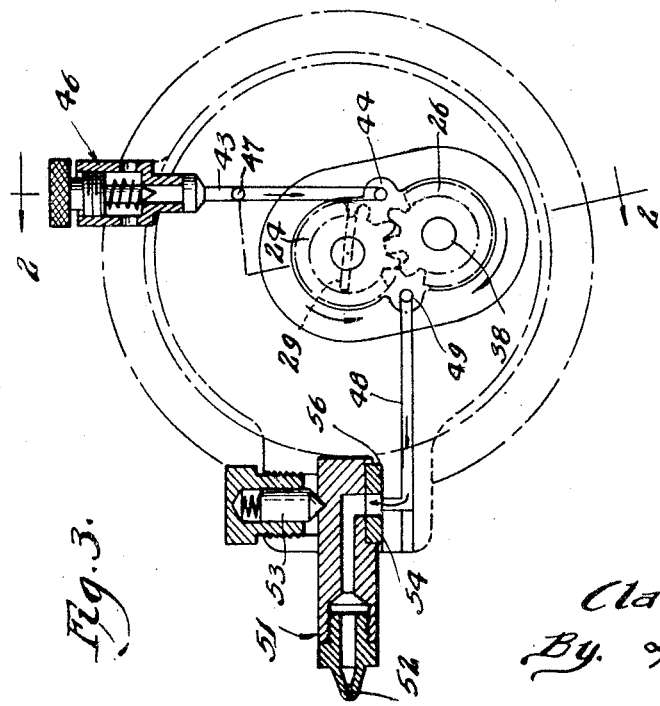
Inventor:
Clarence W. Lanter
By Lee J. Gary
Attorney Patented Dec. 13, 1949

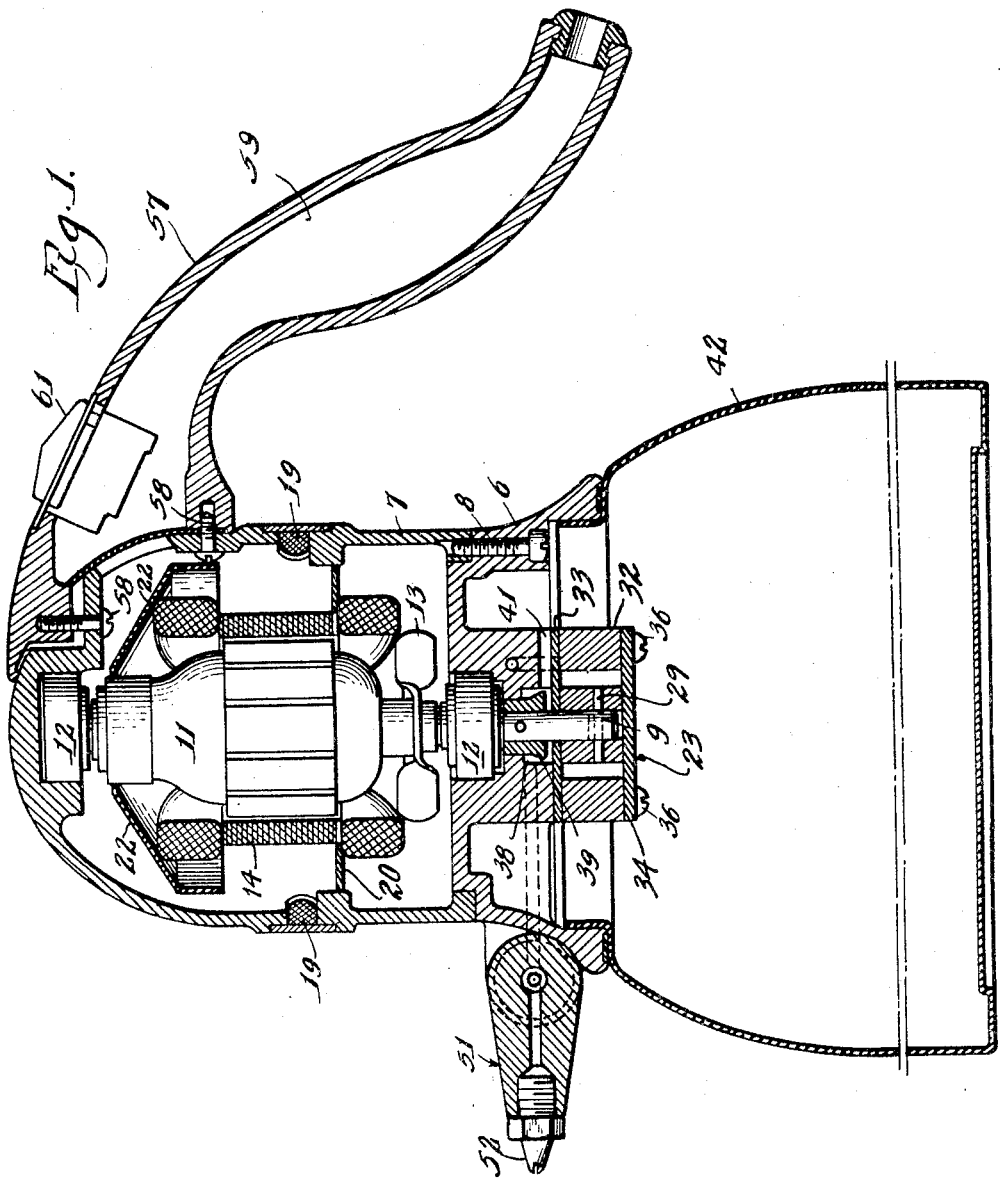

2,491,321

UNITED STATES PATENT OFFICE 2,491,321

ELECTRIC MOTOR STRUCTURE

Clarence W. Lanter, Bartlett, Ill., assignor to Sprayer Corporation of America, Evanston, Ill., a corporation of Illinois Original application May 25, 1946, Serial No. 672,201. Divided and this application November 19, 1947, Serial No. 786,923

2 Claims. (Cl. 172—36)

This application is a division of my co-pending application, Serial No. 672,201, filed May 25, 1946.

This invention relates to improvements in apparatus for spraying liquids, such as insecticides, fumigants, deodorants, and the like, and is more particularly concerned with the provision of an apparatus of this type which is relatively simple and inexpensive in construction and operation and which will not readily get out of order.

This invention further contemplates the provision of a spraying apparatus embodying a motor driven gear pump for mixing, compressing and heating predetermined proportions of liquid and air and then discharging the heated air and fluid mixture to the atmosphere in the form of a fine mist.

This invention further contemplates the provision of a portable spraying apparatus embodying an electric motor provided with improved means for directing a stream of cool air throughout the interior of the motor while the spraying apparatus is in operation.

This invention embodies other novel features, details of construction and arrangement of parts which are hereinafter set forth in the specification and claims, and illustrated in the accompanying drawings wherein:

Fig. 1 is a longitudinal sectional view illustrating a portable sprayer embodying features of this invention.

Fig. 2 is a longitudinal sectional view taken along the line 2—2 of Fig. 3.

Fig. 3 is a diagrammatic view illustrating the flow of air and liquid through the portable sprayer.

Referring now to the drawings for a better understanding of this invention, the portable sprayer is shown as comprising a motor base 6 having a motor housing 7 secured to the upper end thereof by means of cap screws 8. A shaft 9 of an armature 11 is journaled at its one end in the motor housing 7 and at its other end in the motor base 6. The motor shaft 9 is preferably journaled in anti-friction bearings 12, and has a cooling fan 13 secured thereto adjacent the upper side of the motor base 6 for drawing a stream of cool air through the interior of the motor in a novel manner hereinafter described.

A motor field 14 is secured within the housing 7 by means of cap screws 16, and a pair of brushes 17 are mounted in the housing 7 for engagement against commutator 18. The housing 7 is provided with a plurality of air inlet openings 19 and air outlet openings 21 for the passage of a stream of relatively cool air throughout the interior of the motor. A baffle 22 is provided at the upper end of the motor to direct the stream of cooling air around the brushes 17, commutator 18, and thence downwardly between the armature 11 and field 14 for discharge through the outlet openings 21. A lower baffle plate 20 is positioned within the motor housing 7 to prevent a direct passage of air downwardly from the inlet openings 19 to the outlet openings 21.

A gear pump generally indicated at 23, comprises a driving gear 24 and a driven gear 26. The driving gear 24 is provided with an axial opening 27 and a transversely extending driving pin 28 for engagement in a recess 29 formed in the end of the armature shaft 9. The gear pump 23 is provided with a housing 31 comprising a housing body 32 provided with inner and outer cover plates 33 and 34, respectively. The housing body 32 and cover plates 33 and 34 are secured in assembled relation against the lower side of the motor base 6 by means of cap screws 36 and dowel pins 37. The driven gear 26 is journaled on the outer end of a stud 38 mounted in the motor base 6. The lower side of the motor base 6 is formed with a recess at 38 to receive a liquid slinger 39 which is secured to the armature shaft 9 to prevent an upward travel of liquid from the gear pump 23 through the anti-friction bearing 12 and into the interior of the motor. Any liquid passing upwardly along the shaft 9 is thrown outwardly by the slinger 39 for passage along one or more grooves 41 leading to the interior of a liquid container 42. The container 42 may be of any suitable size or shape, and is preferably detachably connected to the lower end of the motor base 6.

An air inlet passage 43 is provided to extend through the motor base 6 from the atmosphere to the inlet side 44 of the gear pump 23. The volume of air through the passage 43 is adapted to be regulated by means of adjustable needle valve 46 which may be of any suitable construction. A liquid supply conduit 47 extends upwardly from adjacent the bottom of the container 42 to lead into the air inlet passage 43.

The motor base 6 is also provided with a discharge passage 48 leading from the pump outlet 49 to a suitable nozzle 51 having a restricted aperture 52. The nozzle 51 is preferably mounted for pivotal adjustment about the axis of a spring pressed pivot pin 53 which also serves to hold the nozzle 51 in frictional leakproof engagement against the bearing surface 54 provided on the motor base 6. A gasket 56, formed of "neoprene" or other suitable gasket material, is interposed between the nozzle 51 and the bearing surface 54.

A suitable lifting handle 57 is detachably connected to the motor housing 7 by means of cap screws 58 and is formed with a passageway 59 to receive electrical conduits (not shown). If desired, an electrical switch 61 may be mounted upon the handle 57 for controlling the flow of current through the electrical conduits leading to the motor.

In the operation of the spraying apparatus thus shown and described, the gear pump 23 acts to create a partial vacuum within the air inlet passage 43 and thus acts to draw liquid upwardly from the container 42 through the liquid conduit 47. The air and liquid then pass from the passage 43 into the inlet end 44 of the gear pump 43, and are then forced toward the outlet end 49 of the pump by the action of the gears 24 and 26 within the gear housing 31. The gear pump 23 thus acts to mix, compress and heat the mixture of liquid and air, and to direct the mixture through the outlet conduit 48 and thence through the restricted orifice 52 of the discharge nozzle 51. By heating a mixture of liquid insecticide and air, it has been learned that the insect killing properties of the insecticide are greatly enhanced. The proportion of air and liquid may readily be varied by merely adjusting the needle valve 46.

While this invention has been shown in but one form, it is obvious to those skilled in the art that it is not so limited but is susceptible of various changes and modifications without departing from the spirit and scope of the claimed invention.

I claim as my invention:

1. In an electric motor, a housing, an armature journaled at its ends in said housing, a field disposed around said armature, said field being secured in spaced relation to said housing to provide an air passageway therebetween, a fan secured to one end of said armature, said housing having an air inlet leading to said air passageway, a baffle plate to close said passageway between said air inlet and said fan, said housing having an air outlet on the opposite side of said baffle plate from said air inlet, a commutator for said armature, a pair of brushes provided on said housing to engage said commutator, and a pair of baffle plates to deflect a stream of air from said air passageway around said commutator and brushes.

2. In an electric motor, a housing having an air inlet and an air outlet, an armature, a field disposed around said armature, said field being secured in spaced relation to said housing to provide an air passageway therebetween, said air inlet being disposed to direct a stream of air into said air passageway, a commutator, brushes, a fan secured to said armature to circulate a stream of air through the motor, a lower baffle disposed between said field and said housing, said air inlet and said air outlet being disposed on opposite sides of said lower baffle, and an upper baffle disposed to direct a stream of air from said air inlet and said air passageway into contact with said brushes and commutator and thence downwardly between said armature and field for discharge through said air outlet.

CLARENCE W. LANTER.

REFERENCES CITED

The following references are of record in the file of this patent:

UNITED STATES PATENTS

| Number | Name | Date |
| --- | --- | --- |
| 1,820,404 | Suter | Aug. 25, 1931 |
| 2,179,341 | Mueller | Nov. 7, 1939 |
| 2,294,586 | Troller | Sept. 1, 1942 |
| 2,321,126 | Breuer | June 8, 1943 |